United States Patent [19]

Hasuda

[11] Patent Number: 5,371,564
[45] Date of Patent: Dec. 6, 1994

[54] SHUTTER DEVICE IN A CAMERA

[75] Inventor: Masanori Hasuda, Kanagawa, Japan

[73] Assignee: Nikon Corporation, Tokyo, Japan

[21] Appl. No.: 29,429

[22] Filed: Mar. 9, 1993

[30] Foreign Application Priority Data

Mar. 9, 1992 [JP] Japan .................................. 4-85922
Jan. 8, 1993 [JP] Japan .................................. 5-18055

[51] Int. Cl.$^5$ ............................................ G03B 9/40
[52] U.S. Cl. ................................... 354/246; 354/249
[58] Field of Search ............... 354/245, 246, 247, 248, 354/249, 250

[56] References Cited

U.S. PATENT DOCUMENTS 4,714,336 12/1987 Suzuki .................................. 354/246
4,975,722 12/1990 Suzuki et al. ...................... 354/246
5,159,371 10/1992 Fukuda .............................. 354/246

Primary Examiner—Michael L. Gellner
Assistant Examiner—J. K. Han
Attorney, Agent, or Firm—Jacobson, Price, Holman & Stern

[57] ABSTRACT

A camera shutter device having a charging rotation axis mounted to the camera body rather than mounted to the shutter base. A charging force of a shutter charging mechanism is transmitted through a linkage lever rotatably supported by to charging rotation axis on the shutter base to a shutter mechanism, wherein leading blades and trailing blades are charged by the charging force. The charging rotation axis is positioned outside an operation area of the leading and trailing blades and is connected to a camera body so as to be unable to move in any plane directions of the shutter base, whereby the charging force is not directly applied to the shutter base but to the camera body so that the shutter base is prevented from being deformed.

11 Claims, 8 Drawing Sheets

SHUTTER DEVICE IN A CAMERA

BACKGROUND OF THE INVENTION

The present invention relates to an attachment structure of a camera shutter device for attaching a camera shutter device to a camera body.

FIG. 1 shows a conventional camera shutter device comprising a shutter blade mechanism 1, a shutter mechanism 2 for driving the shutter blade mechanism 1, and a shutter charging mechanism 3 for charging the shutter mechanism 2. The shutter blade mechanism 1 is positioned so as to cover an aperture 5 which is formed on a shutter base 4 for transmitting a light beam to expose a film. As shown in FIG. 1, the shutter mechanism 2 is fixed on the shutter base 4 between the shutter blade mechanism 1 and a sprocket 11 which is positioned so as to guide the film to the right side of a spool 12 for taking up the film. The shutter blade mechanism 1 and the shutter mechanism 2 are attached on a camera body not shown through the shutter base 4.

A charging lever 6 of the shutter charging mechanism 3 is connected through a linkage lever 7 to a charging rotation axis 8 which charges the shutter mechanism 2 when rotated in a clockwise direction in FIG. 1. When charged, the shutter blade mechanism 1 returns to an initial position thereof and a release button not shown comes to be in a state operable to expose the film.

In the conventional camera shutter device mentioned above, the shutter base 4 is fixed by screws on the camera body at the three positions a, b and c as shown in FIG. 1. The end of axis 8 of the shutter mechanism 2, to which the charging lever 6 of the shutter charging mechanism 3 is connected through the linkage lever 7, is fixed on the shutter base 4 for example by a caulked joint.

In the conventional camera shutter device mentioned above, however, since the end of axis 8 is fixed on the shutter base 4, the charging force by the shutter charging mechanism 3 is directly transmitted through the charging rotation axis 8 to the shutter base 4 which is screwed on the camera body at the three positions a, b and c. Therefore, it has a problem that the shutter base 4 is deformed in the plane direction by the charging force. Especially, in a high-speed shutter device, as the charging force of the shutter charging mechanism 3 is strong, the deformation of the shutter base 4 is scaled up, whereby the operation of the shutter blade mechanism 1 is affected so as to deteriorate the shutter performance, and a loss of the charging force is scaled up.

Therefore, to solve these problems, the number of the screws by which the shutter base 4 is fixed to the camera body can be increased so as to prevent the shutter base 4 from being deformed by the charging force of the shutter charging mechanism 3. However, the method to increase the number of screws has a defect that the flatness of the shutter base 4 is affected in a static state and the shutter performance of the shutter blade mechanism 1 is deteriorated as is in the conventional device. So, it is not preferable to adopt the method mentioned above.

SUMMARY OF THE INVENTION

An object of the invention is to provide an attachment structure of a camera shutter device wherein a shutter base can be attached on a camera body so that the shutter base is not deformed by a charging force of a shutter charging mechanism and the flatness of the shutter base is not affected in a static state.

According to one aspect of the present invention, there is provided an attachment structure of a camera shutter device for attaching to a camera body a shutter base which is provided with a shutter blade mechanism having leading blades and trailing blades which move between a position to open an aperture for passing through a light beam to expose a film and a position to cover said aperture, and a shutter mechanism which is charged by a shutter charging mechanism to drive said shutter blade mechanism, said shutter mechanism comprising, a transmitting member for moving in response to a charging force of said shutter charging mechanism and for transmitting said charging force to said leading and trailing blades, and a supporting member held on said shutter base for movably supporting said transmitting member, wherein said supporting member is positioned outside an operation area of said leading and trailing blades and connected to said camera body so as to be unable to move in any plane directions of said shutter base.

In the attachment structure described above, the supporting member in the shutter mechanism is connected to the camera body outside the operation area of the shutter blade mechanism so as to be unable to move in any plane directions of the shutter base, which in turn is prevented from being deformed in the plane directions by the charging force even if the charging force is applied to the supporting member, because the force is not directly applied to the shutter base but to the camera body. Furthermore, the energy loss of charging force can be reduced at the time of charging operation. Also, it is not necessary to increase the number of screws to fix the shutter base to the camera body, whereby the flatness of the shutter base in the static state and therefore the shutter performance can be kept.

According to another aspect of the present invention, there is provided an attachment structure of a camera shutter device for attaching to a camera body a shutter base which is provided with a shutter blade mechanism having leading blades and trailing blades which are moved between a position to open an aperture for passing through a light beam to expose a film and a position to cover said aperture, and a shutter mechanism which is charged by a shutter charging mechanism to drive said shutter blade mechanism, said shutter mechanism comprising a leading blade driving lever for driving said leading blades, a trailing blade driving lever for driving said trailing blades, a leading blade driving lever axis for rotatably supporting said leading blade driving lever, and a trailing blade driving lever axis for rotatably supporting said trailing blade driving lever, wherein at least one of said leading blade driving lever axis and trailing blade driving lever axis is connected to said camera body so as to be unable to move in any plane directions of said shutter base.

In the attachment structure, at least one of the leading and trailing blade driving lever axes is connected to said camera body so as to unable to move in any plane directions of said shutter base, which in turn is prevented from being deformed. Furthermore, since it is not necessary to consider the operation area of the leading and trailing blades, more compact structure can be provided.

DETAILED DESCRIPTION OF THE PREFERRED EMBODIMENT

Figure 1:
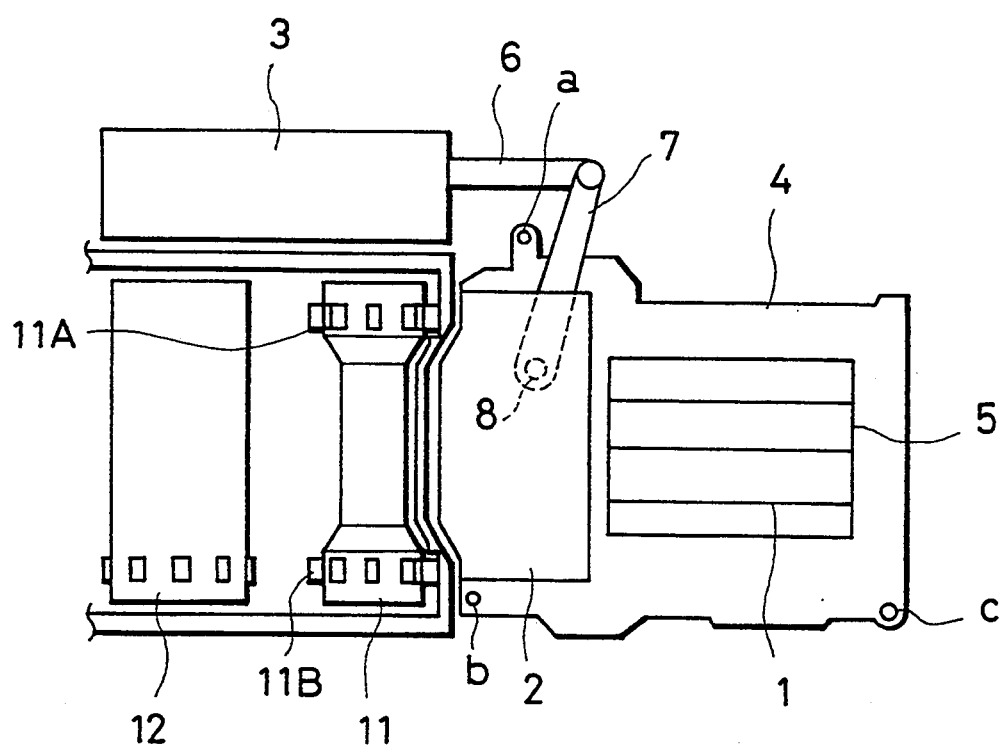
FIG. 1 is a plan view showing a state wherein a conventional camera shutter device is attached to a camera body.
Figure 2:
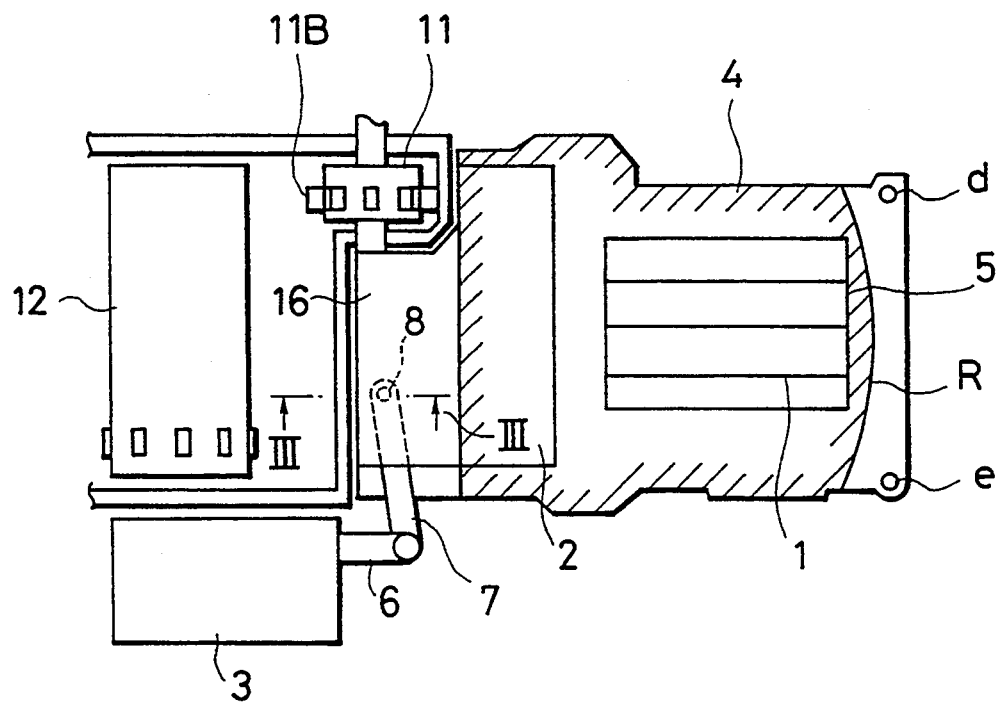
FIG. 2 is a plan view showing a state wherein a camera shutter device is attached to a camera body according to the first embodiment of the invention.
Figure 3:
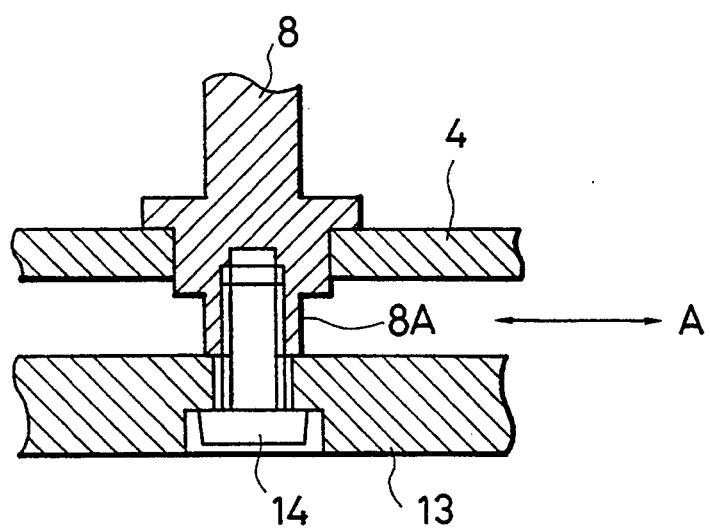
FIG. 3 is a cross sectional view along a line III—III in FIG. 2.

The embodiments of the present invention are described hereinafter with reference to the drawings. FIGS. 2 and 3 show a state wherein a camera shutter device is attached to a camera body and a cross sectional view of the part thereof according to the first embodiment of the present invention respectively.

The members of the embodiment corresponding to the conventional camera shutter device denoted by the same number and the explanation thereof are omitted as far as the members have the same structures or functions as is in the latter.

In the embodiment, as shown in FIG. 2, the shutter base 4 is fixed to a camera body (shown in FIG. 3) for example by screws at the two points d and e. As shown in FIG. 3, an end 8A of the charging rotation axis 8 of the shutter mechanism 2 is connected to the shutter base 4 for example by a press fitting and furthermore to the camera body 13 by a vis 14. Of course, the end 8A can be connected to the camera body 13 through a member (not shown) which is fixed to the camera body 13. Namely, in this case, the end 8A is indirectly connected to the camera body 13. Thus, the charging rotation axis 8 is connected to the camera body 13 so as to be unable to move in any plane direction of the shutter base 4 (in a direction shown by an arrow A in FIG. 3) in spite of the charging force by the shutter charging mechanism 3.

Figure 4:
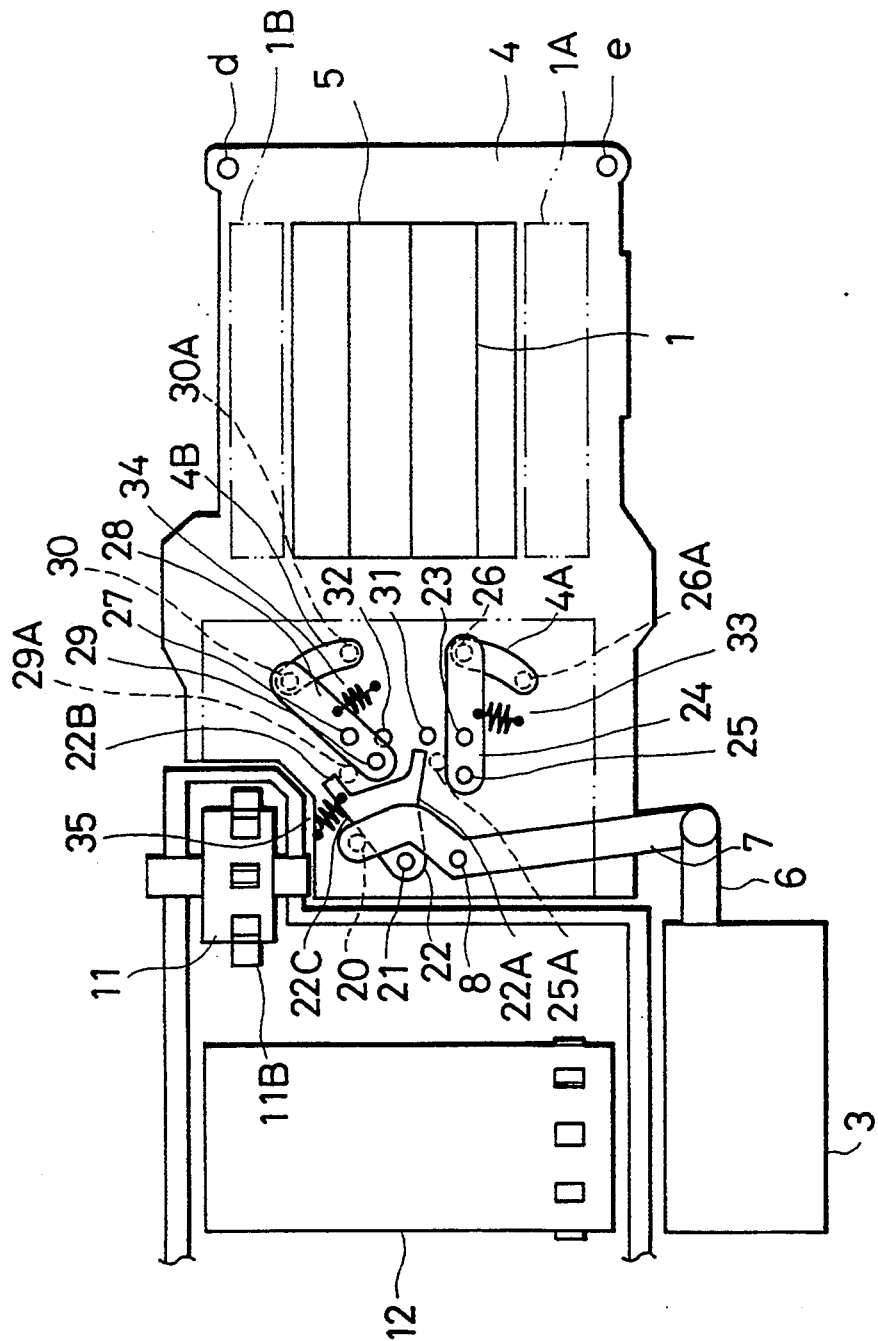
FIG. 4 is a plan view for explaining a structure of a shutter mechanism in the embodiment shown in FIG. 2.

The charging force applied to the shutter base 4 will be hereinafter described with reference to FIG. 4 showing a detail structure of the shutter mechanism 2.

As shown in FIG. 4, a leading blade driving lever axis 23, which rotatably supports a leading blade driving lever 24 on the upper side of the shutter base 4, is implanted on the shutter base 4. A roller 25 is rotatably supported at the left end of the leading blade driving lever 24 in the drawing and a leading blade driving pin 26 is fixed to the left end thereof. The leading blade driving lever 24 is biased by a leading blade driving spring 33 so as to rotate clockwise.

As is in the conventional shutter device, the shutter blade mechanism 1 has leading blades 1A which are located in a folded state under the aperture 5 in FIG. 4 at the time of film exposure and trailing blades 1B which are located in a folded state after completion of charging. The leading blades 1A are connected to a pair of arms (corresponding to arms 51 and 53 in an embodiment shown in FIG. 6 described hereinafter) which forms a parallel link and also the trailing blades 1B are connected to another pair of arms (corresponding to arms 54 and 56 in the embodiment in FIG. 6) which forms a parallel link.

One of the pair of arms (for example the arm 51 in FIG. 6) is rotatably supported on the leading blade driving lever axis 23 under the shutter base 4 and the other of the pair of arms (for example the arm 53 in FIG. 6) is rotatably supported on an axis 31 fixed under the shutter base 4.

The arm rotatably supported by the leading blade driving lever axis 23 (the arm 51 in FIG. 6) is connected to the leading blade driving pin 26 elongating to the direction under the shutter base 4 through a slot 4A formed on the shutter base 4 so as to rotate together with the leading blade driving lever 24. When the leading blade driving lever 24 rotates, the leading blades 1A having a plurality of blades move between a position wherein the leading blades 1A cover the aperture 5 and a position wherein the leading blades 1A are positioned under the aperture 5 in a state that the blades thereof are folded and the aperture 5 is opened.

The leading blade driving lever 24 is locked by a locking mechanism not shown so as to be unable to rotate clockwise by the biasing force of the leading blade driving spring 33 at the waiting time when the leading blades 1A are in a position covering the aperture 5. At the time of operation of a release button not shown, the leading blade driving lever 24 is unlocked by a known unlock mechanism not shown, and the leading blade driving lever 24 rotates clockwise according to the biasing force of the leading blade driving spring 33, whereby the leading blades 1A of the shutter blade mechanism 1 start to open the aperture 5. When the leading blade driving lever 24 stops by contacting with a stopping member not shown, the leading blades 1A are located in the folded state under the aperture 5 (at a position denoted by 1A in FIG. 4), the aperture 5 is completely opened and the roller 25 and the leading blade driving pin 26 move to positions denoted by 25A and 26A respectively. Furthermore, at this time, as described hereinafter, the trailing blades 1B are folded and positioned over the aperture 5 at a position denoted by 1B in FIG. 4 and the exposure of the film is started.

A trailing blades driving lever axis 27 rotatably supporting the trailing blade driving lever 28 over the shutter base 4 is implanted on the shutter base 4. A roller 29 is rotatably held at the left end of the trailing blade-driving lever 28 and there is fixed at the right end thereof a trailing blade driving pin 30 which protrudes from the shutter base 4 through a slot 4B formed thereon. The trailing blade driving lever 28 is biased by a trailing blade driving spring 34 so as to rotate clockwise. Axes 31 and 32 are fixed close to one another under the shutter base 4.

One of another pair of the arms of the shutter blade mechanism 1 (the arm 54 in FIG. 6) is rotatably supported by the trailing blade driving lever axis 27 under the shutter base 4. Also, the other of the pair of the arms of the shutter blade mechanism 1 (the arm 56 in FIG. 6) is rotatably supported by the axis 32 fixed under the shutter base 4.

Furthermore, an arm connected to the trailing blade driving lever axis 27 (the arm 54 in FIG. 6) is connected to the trailing blade driving pin 30 protruding from the shutter base 4 through a slot 4B formed thereon so as to rotate together with the trailing blade driving lever 28. When the trailing blade driving lever 28 rotates, the trailing blades 1B having a plurality of blades move between a position wherein the trailing blades 1B cover the aperture 5 and a position wherein the trailing blades 1B are folded over the aperture 5, which in turn is opened.

Namely, the slot 4B, trailing blade driving lever axis 27, trailing blade driving lever 28, roller 29, trailing blade driving pin 30, axis 32 or trailing blade driving spring 34 in the side of trailing blade driving lever 28, corresponds to the slot 4A, leading blade driving lever 20 axis 23, leading blade driving lever 24, roller 25, leading blade driving pin 26, axis 31 or leading blade driving spring 33 in the side of leading blade driving lever 24, and has the same function as of the latter, respectively. At the waiting time when the trailing blades 1B are folded and positioned over the aperture 5, the trailing blade driving lever 28 is locked by a lock mechanism not shown so as to be unable to rotate in spite of the biasing force of the trailing blade driving spring 34.

At a predetermined time after an operation of the release button, in other words, after the aperture 5 is opened by the leading blades 1A, the trailing blade driving lever 28 is unlocked by a known unlock mechanism and rotates clockwise until to come in contact with a stopping member not shown in accordance with the biasing force of the trailing blade driving spring 34. At this time, the trailing blades 1B comprising a plurality of blades move to a position where the trailing blades 1B cover the aperture 5 from a position where the trailing blades 1B are folded and located over the aperture 5 so as to open it. Furthermore, at this time, the roller 29 and the trailing blade driving pin 30 move to the positions denoted by 29A and 30A respectively, whereby the film exposure is completed.

A charging cam 22 formed in a shape of a letter V with peripheral cams 22A, 22B and 22C is rotatably sustained over the shutter base 4 by a charging cam shaft 21 implanted on the shutter base 4. A charging roller 20 is rotatably held at one end of the linkage lever 7 so as to be able to come in contact with the peripheral cam 22C. Since the charging cam 22 is biased by a spring 35 counterclockwise, when not charged, the peripheral cam 22C comes in contact with the charging roller 20, the linkage lever 7 rotates counterclockwise, and the charging lever 6 returns to an initial position most right in FIG. 4.

The peripheral cams 22A and 22B are positioned so as to come in contact with the rollers 25 and 29 respectively when the charging cam 22 is charged and rotated clockwise, but not so as to come in contact with the rollers 25A and 29A respectively in limit positions when the charging lever 6 is in the initial position and the charging cam 22 is not charged.

When the charging operation is started at a predetermined timing in a state that the leading blade driving lever 24 and trailing blade driving lever 28 are in the rotation limit position, namely, in a state that the film exposure is completed, the charging lever 6 moves to the left in the drawing according to the charging force by the shutter charging mechanism 3, the linkage lever 7 rotates clockwise, and the charging roller 20 comes in contact with the peripheral cam 22C, whereby the charging cam 22 rotates clockwise against the biasing force by the spring 35. When the peripheral cams 22A and 22B come in contact with the rollers 25A and 29A respectively, the leading blade driving lever 24 and the trailing blade driving lever 28 rotate counterclockwise against the biasing forces by the leading blade driving spring 33 and the trailing blade driving spring 34 respectively.

Furthermore, when the leading blade driving lever 24 and the trailing blade driving lever 28 are locked by the lock mechanism not shown, the charging operation is completed and the activation of the charging lever 6 to the left is stopped. At this time, the charging cam 22, linkage lever 7 and charging lever 6 return to the initial positions by the biasing force of the spring 35 respectively. Thus, after charging operation, the release button returns in a state to be able to be operated again for the next exposure.

While the charging operation is performed as described above, the charging force against the biasing forces by the leading blade driving spring 33, trailing blade driving spring 34 and return spring 35 is applied to the charging rotation axis 8, charging cam shaft 21, leading blade driving lever axis 23 and trailing blade driving lever axis 27. Since these axes and shaft are implanted on the shutter base 4 the charging force is transmitted to the shutter base 4 and there is a probability of deformation of the shutter base 4, as described above.

In the embodiment, however, as shown in FIG. 3, because the charging rotation axis 8 is screwed to the shutter base 4 so as to be unable to move in a plane direction of the shutter base 4, namely, in the direction represented by the arrow A in FIG. 3, the charging force can not be directly applied to the shutter base 4, which in turn is prevented from being deformed and the loss of the charging force can be effectively reduced.

Although the end 8A of the charging rotation axis 8 is screwed to the camera body 13 by the vis 14 in the embodiment, the end 8A can be connected with the camera body 13 through a press fitting or engagement so as to be unable to move in a plane direction of the shutter base 4. Where the connection is performed by the engagement, since the shutter base 4 is screwed to the camera body 13 only at the two points d and e, it is necessary to secure the shutter base 4 to the camera body 13 by a screw at another point.

Usually there are provided two sprockets engaging with upper and lower perforations of the film respectively in a camera body. In the embodiment, however, one of the two sprockets 11 is omitted, whereby a space 16 in which the charging rotation axis 8 is positioned is formed outside an operation area R of the leading blades 1A and trailing blades 1B as shown in FIG. 2. Thus, as shown in FIG. 3, the charging rotation axis 8 can be connected with the camera body 13 through a space where the leading blades 1A and trailing blades 1B are positioned between the shutter base 4 and the camera body 13.

If the charging rotation axis 8 were positioned within the operation area R of the leading blades 1A or trailing blades 1B, it would be necessary to arrange the connection structure between the axis 8 and the shutter base 4 so that the operation of the leading blades 1A and trailing blades 1B would not be disturbed by the connection, which would lead a complex and expensive structure. According to the embodiment, however, because the charging rotation axis 8 is positioned outside the operation area R of the leading blades 1A and trailing blades 1B, the camera body 13 can be provided in a simple structure and the charging rotation axis 8 can be assembled with ease without affection of the leading blades 1A and trailing blades 1B.

In the embodiment, although the lower sprocket 11 is omitted, the upper or both of the upper and lower sprockets 11 can be omitted.

In the first embodiment described above, it is difficult to suppress the influence of the charging force from the axes other than the charging rotation axis 8. The second embodiment shown in FIGS. 5 and 6 and the third embodiment shown in FIGS. 5 and 7 solve the problem. For the convenience of explanation, FIG. 5 is used for the second and third embodiments, however, the second and third embodiments are independent each other although the two embodiments can be combined.

Figure 5:
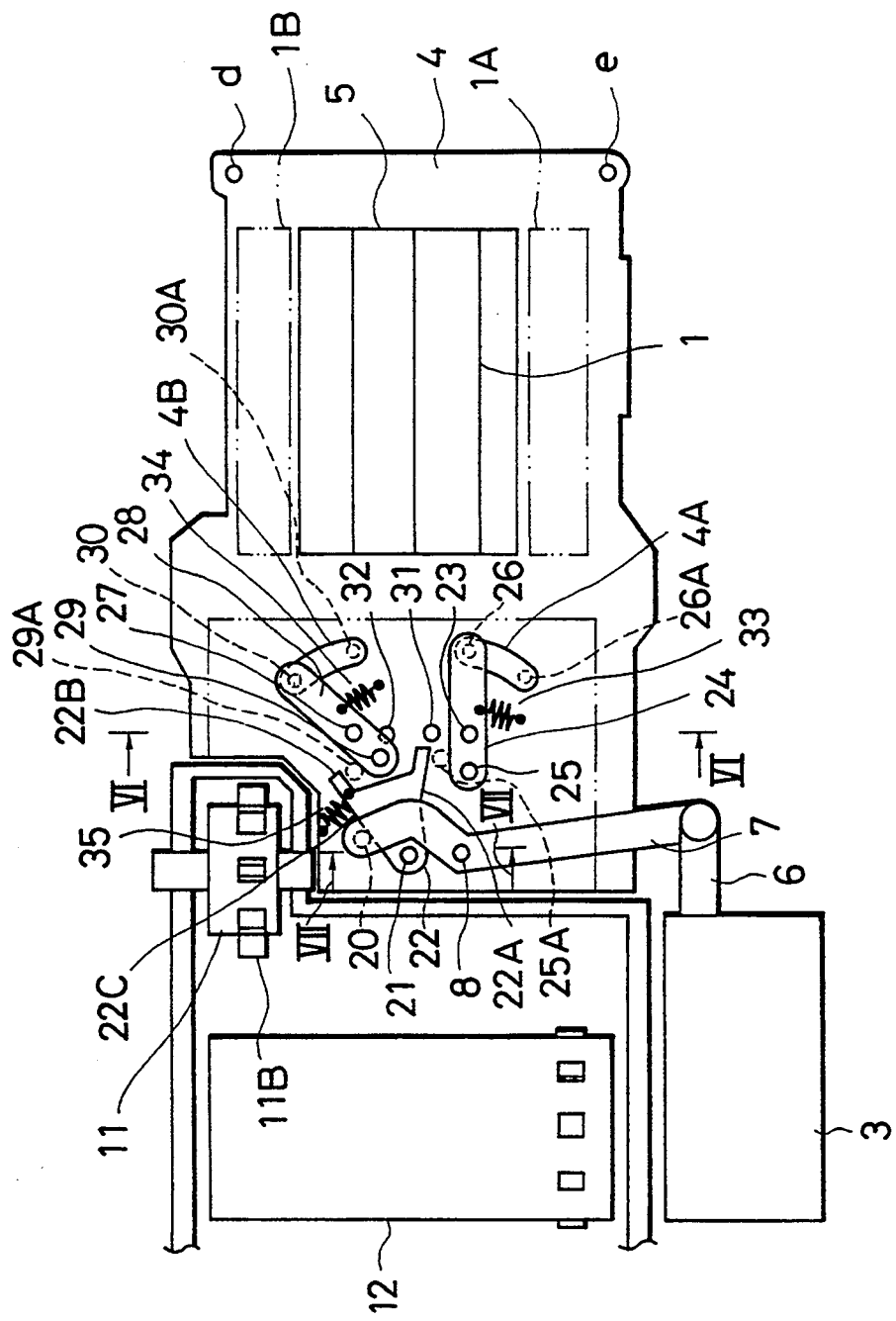
FIG. 5 is a plan view showing a state wherein a camera shutter device is attached to a camera body according to the second embodiment of the invention.
Figure 6:
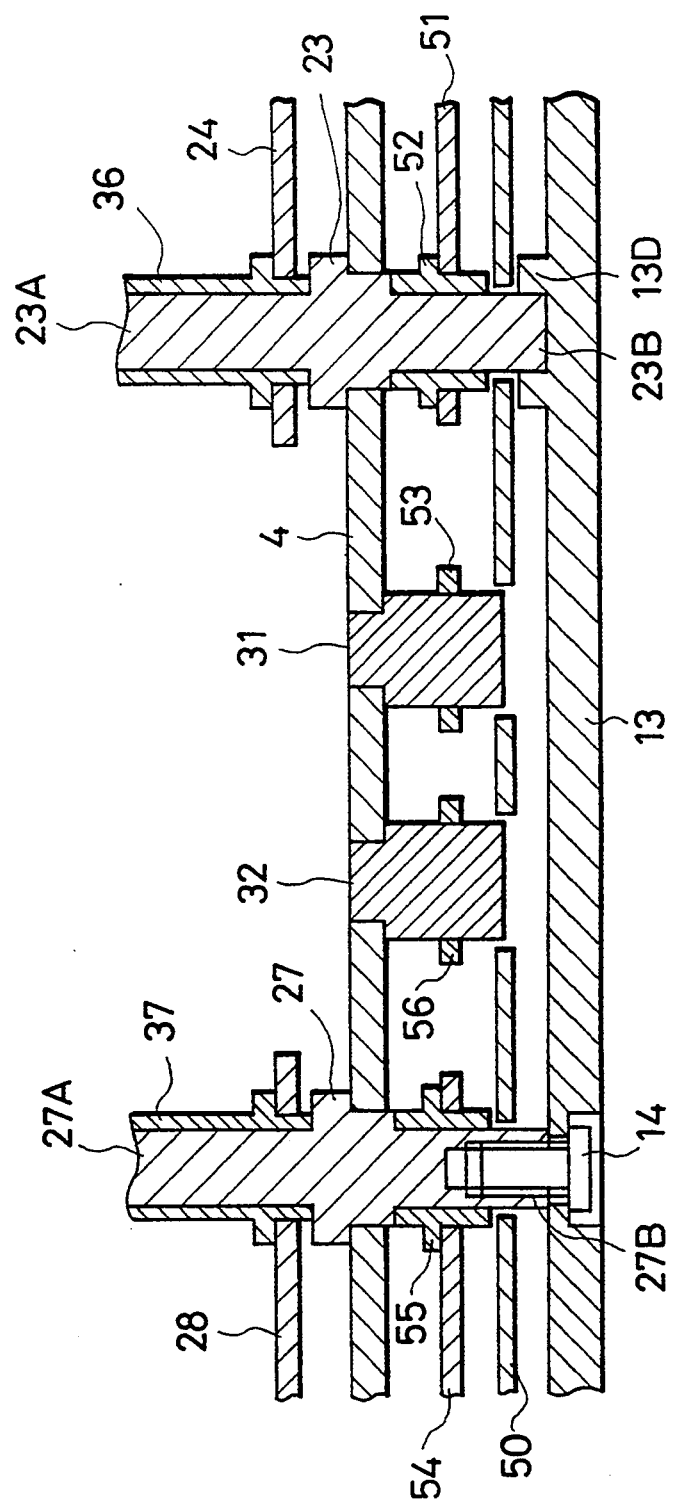
FIG. 6 is a cross sectional view along a line VI—VI in FIG. 5.

In the second embodiment shown in FIGS. 5 and 6, an engaging portion 23A of the leading blade driving lever axis 23 rotatably supports a collar 36 on which the leading blade driving lever 24 is fitted. Also, an engaging portion 27A of the trailing blade driving lever axis 27 rotatably supports a collar 37 on which the trailing blade driving lever 28 is fitted.

An end 23B of the leading blade driving lever axis 23 rotatably supports between the shutter base 4 and a cover plate 50 a collar 52 on which an arm 51, one of a pair of arms of the leading blades 1A, is fitted. The cover plate 50 is for limitation of the movement of the leading blades 1A and trailing blades 1B positioned between the shutter base 4 and the cover plate 50 so as to prevent the leading blades 1A and trailing blades 1B from extending unnecessarily in a vertical direction in FIG. 6. The arm 51 is connected with the leading blade driving lever 24 through the leading blade driving pin 26 so as to rotate together with the lever 24. Furthermore, another arm 53 of the leading blades 1A is rotatably supported by the axis 31 implanted on the shutter base 4.

Also, an end 27B of the trailing blade driving lever axis 27 rotatably supports between the shutter base 4 and the cover plate 50 a collar 55 on which an arm 54, the other arm of a pair of arms of the trailing blades 1B, is fitted. The arm 54 is connected with the trailing blade driving lever 28 through the trailing blade driving pin 30 so as to rotate together with the lever 28. Furthermore, another arm 56 of the trailing blades 1B is rotatably supported by the axis 32 implanted on the shutter base 4.

Thus, by supporting the leading blade driving lever 24, trailing blade driving lever 28, and arms 51 and 54 to the axes 23 and 27 through collars 36, 37, 52 or 55 respectively, the contact surfaces can be enlarged, whereby wear of the members can be reduced at the time of rotation.

On the other hand, the end 23B of the leading blade driving lever axis 23 is engaged with an axis engaging portion 13D formed on the camera body 13 and the end 27B of the trailing blade driving lever axis 27 is screwed on the camera body 13 by the screw 14. Also, because the shutter base 4 is screwed at the positions d and e to the camera body 13, it in turn is screwed at the three points. Accordingly, it is possible to prevent the shutter base 4 from deforming because of the charging force in keeping the flatness of the shutter base 4 in a static state.

Although the leading blade driving lever axis 23 and trailing blade driving lever axis 27 are positioned within the operation area R of the leading blades 1A and trailing blades 1B, these are in essence for the rotation axes for the blades, so that the operation of the blades can not be disturbed by the connection of the ends of the axes 23 and 27 and the camera body 13. Accordingly, in the embodiment, it is not necessary to omit any sprocket 11 so as to form the space 16 outside the operation area R of the leading and trailing blades 1A and 1B.

Also, in the second embodiment, the end 23B of the leading blade driving lever axis 23 is engaged with the camera body 13 and the end 27B of the trailing blade driving lever axis 27 is screwed to the camera body 13, however, instead of that, the end 23B of the leading blade driving lever axis 23 can be screwed to the camera body 13 and the end 27B of the trailing blade driving lever axis 27 can be engaged with the camera body 13.

Figure 7:
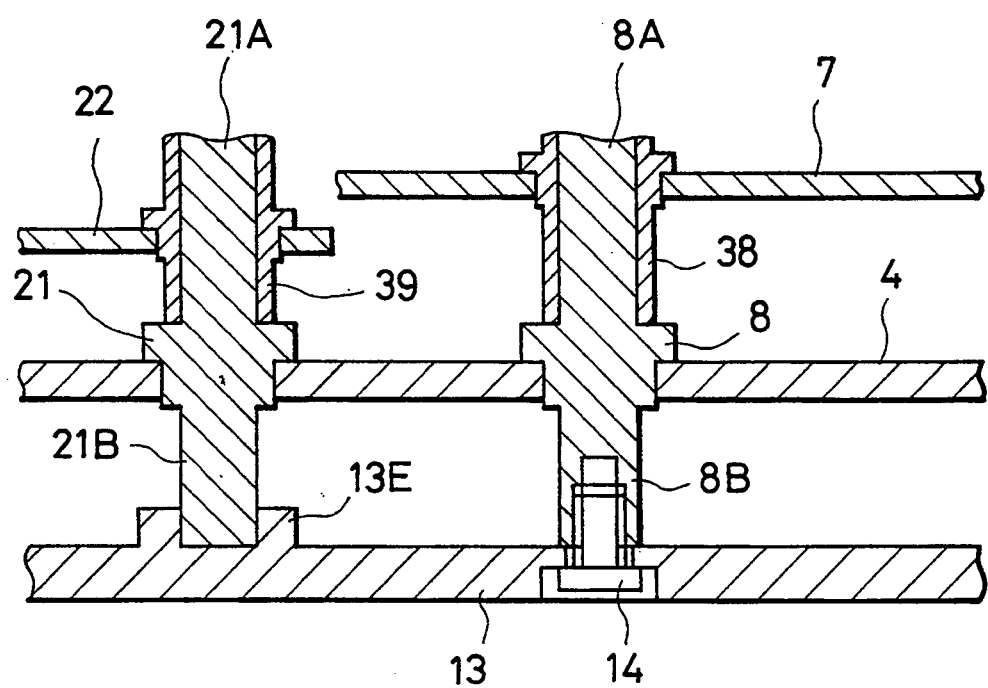
FIG. 7 is a cross sectional view along a line VII—VII in FIG. 5.
Figure 8:
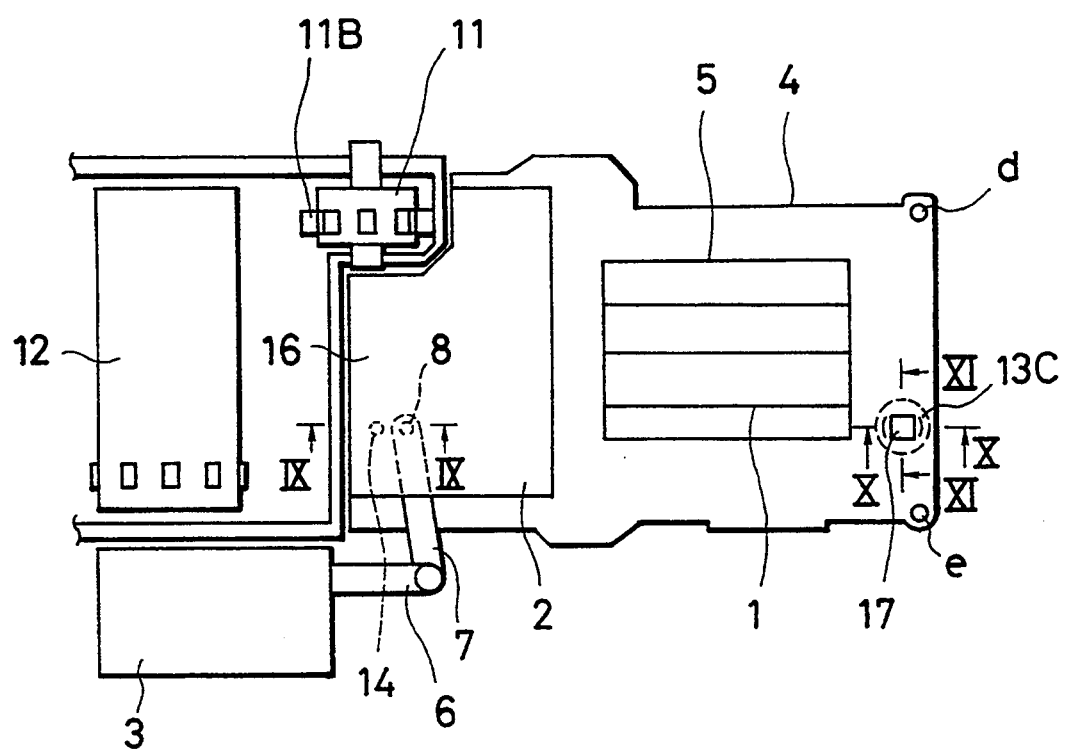
FIG. 8 is a plan view showing a state wherein a camera shutter device is attached to a camera body according to the third embodiment of the invention.
Figure 9:
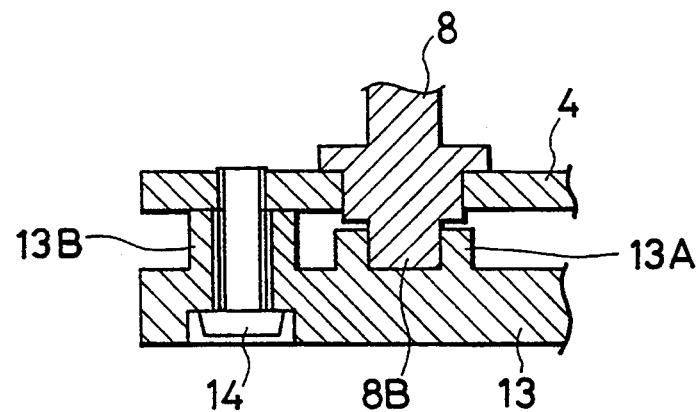
FIG. 9 is a cross sectional view along a line IX—IX in FIG. 8.

In the third embodiment shown in FIGS. 5 and 7, an engaging portion 8A of the charging rotation axis 8 positioned outside the operation area R of the leading blades 1A and trailing blades 1B rotatably supports a collar 38 on which the linkage lever 7 is fixed. Also, an engaging portion 21A of the charging cam shaft 21 positioned outside the operation area R of the leading blades 1A and trailing blades 1B rotatably supports a collar 39 on which the charging cam 22 is fixed. An end 8B of the charging rotation axis 8 is screwed to the camera body 13 by the vis 14 and an end 21B of the charging cam shaft 21 is engaged with an engaging portion 13E formed on the camera body 13.

In the third embodiment, as in the other embodiments, the shutter base 4 is screwed at the three points, namely at the points d and e shown in FIG. 5 and at the end 8B, and is engaged at one position by the end 21B.

Also, in the third embodiment, instead of screwing the end 8B of the charging rotation axis 8 and engaging the end 21B of the charging cam shaft 21 with the camera body 13, the end 8B of the charging rotation axis 8 can be engaged with the camera body 13 and the end 21B of the charging cam shaft 21 can be screwed to the camera body 13.

Furthermore, the second and third embodiments can be combined; for instance, the variation of the second embodiments shown in FIG. 6 wherein the trailing blade driving lever axis 27 is not screwed to the camera body 13 although the leading blade driving lever axis 23 is engaged with the camera body 13, and the variation of the third embodiment shown in FIG. 7 wherein the charging rotation axis 8 is screwed to the camera body 13 but the charging cam shaft 21 is not engaged with the camera body 13. Furthermore, such a combination can be provided that the leading blade driving lever axis 23 is connected by engagement, the trailing blade driving lever axis 27, the charging rotation axis 8 and one of the points d and e are connected by screwing, namely in this case, the charging cam shaft 21 is not engaged with and another of points d and e is not screwed to the camera body 13 respectively. Also, instead of screwing one of the points d and e, the charging cam shaft 21 can be screwed. Furthermore, other points other than points d and e can be screwed, if necessary. The important point is that the shutter base 4 and the camera body 13 are connected by screwing at the three points and engaging at one point.

The connecting axes and shaft and the connection method thereof can be selected so that the shutter base 4 is effectively prevented from being deformed.

FIGS. 8 to 11 show the fourth embodiment in which the shutter base 4 is screwed at the two points d and e to the camera body 13. The end 8B of the charging rotation axis 8 in the shutter charging mechanism 2 is engaged with an engaging portion 13A formed on the camera body 13 by press fitting, caulking and so on so that the charging rotation axis 8 can not move in any plane directions of the shutter base 4 even if it receives the charging force from the shutter charging mechanism 3. Also, the shutter base 4 is screwed by the vis 14 at a boss 13B formed on the camera body 13 in the vicinity of the charging rotation axis 8. Where the distance between the boss 13B and the charging rotation axis 8 is long, when there is a clearance between the diameters of the axis 8 and the engaging portion 13A, the charging force can be transmitted to the shutter base 4 with ease. Therefore, it is preferable that the distance between the boss 13B and the charging rotation axis 8 is short.

Figure 10:
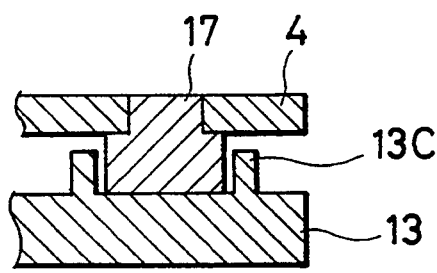
FIG. 10 is a cross sectional view along a line X—X in FIG. 8.
Figure 11:
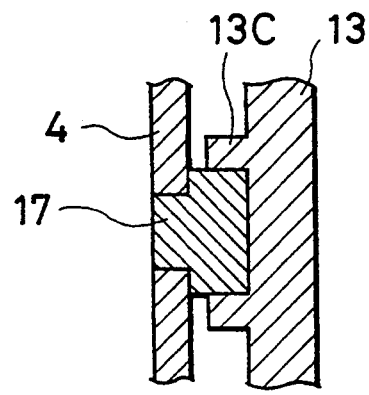
FIG. 11 is a cross sectional view along a line XI—XI in FIG. 8.

Furthermore, an axis 17, which is inserted in a engaging portion 13C in a shape of a slot formed on the camera body 13 as shown in FIGS. 10 and 11, is implanted outside the operation area R of the shutter blade mechanism 1 (leading blades 1A and trailing blades 1B) on the shutter base 4 opposite to the shutter mechanism 2 (the charging rotation axis 8), namely in the right side of the aperture 5. The slot of the engaging portion 13C has a length in a horizontal direction in FIGS. 8 and 10 longer than in a vertical direction in FIGS. 8 and 11, and is positioned so that a longitudinal center line of the slot passes through a center of the charging rotation axis 8. As shown in FIG. 10, the left and right sides of the inner surface of the slot (the engaging portion 13C) are not in contact with the axis 17, as shown in FIG. 11, however, the upper and lower sides thereof are in contact with the axis 17.

In the fourth embodiment, the shutter base 4 is screwed at three points, namely the boss 13B and positions d and e, and engaged at two points, namely axes 8 and 17. Thus, by engaging at two points having a relatively long distance, even if there are some clearances in the engaging points, the rotation of the shutter base 4 because of the clearances in a direction perpendicular to a line passing the two points can be reduced. If the both engagements of the two positions were tight and the relative positions thereof had some variations, the shutter base 4 would be deformed in a static state. Therefore, in the embodiment, the slot (the engaging portion 13C) extending to the direction of the axis 8 is used in one of the two engagements, whereby the position variations of the two axes can be absorbed.

In the fourth embodiment, although the charging rotation axis 8 is connected to the camera body 13, where the charging force is transmitted to the shutter base 4 by the axes other than the axis 8, the other axes (for instance, the charging cam shaft 21, leading blade driving lever axis 23 or trailing blade driving lever axis 27 in FIGS. 4 and 5) can be connected to the camera body 13.

Furthermore, the shutter base 4 can be screwed to the camera body 13 through another member fixed on the shutter base 4.

The fourth embodiment can be combined with any of the first to third embodiments.

What is claimed is:

1. A shutter device in a camera comprising:
a shutter base fixed to a camera body, and
a charging mechanism for generating a charging force,
said shutter base being provided with
shutter blades moving between a position to open an aperture for passing through a light beam to expose a film and a position to cover said aperture,
a transmitting member for transmitting a charging force for charging said shutter blades, and
a supporting member for rotatably supporting said transmitting member on a side opposite to said camera body, said supporting member passing through said shutter base at a position outside a moving area of said shutter blades and being directly connected at one end thereof to said camera body.

2. A shutter device according to claim 1,
and further comprising a sprocket for guiding said film which is positioned at either an upper or a lower side of the shutter device, and wherein
said supporting member is positioned proximate the side where said sprocket is not located.

3. A shutter device according to claim 1,
wherein said supporting member comprises a plurality of members, at least one of which is screwed on said camera body, the supporting members which are not screwed on said camera body being engaged with said camera body.

4. A shutter device according to claim 1,
wherein said supporting member is engaged with said camera body, and
said shutter base is screwed to said camera body in the vicinity of said supporting member.

5. A shutter device according to claim 1,
wherein said supporting member is positioned on one side of said aperture, and
said shutter device further comprises a connecting member for connecting said shutter base to said camera body on a side opposite to said supporting member against said aperture.

6. A shutter device according to claim 5,
wherein said connecting member comprises a slot.

7. A shutter device according to claim 6,
wherein said slot is directed to said supporting member.

8. A shutter device according to claim 1, and further comprising:
a linkage lever for transmitting said charging force of said charging mechanism to said shutter blades,
a charging rotation axis for rotatably supporting said linkage lever,
a charging cam to which said charging force is transmitted from said linkage lever, and
a charging cam shaft rotatably supporting said charging cam,
said supporting member being at least one of said charging rotation axis and charging cam shaft.

9. A shutter device according to claim 8,
wherein said shutter device further comprises a collar to which said linkage lever or charging cam is fitted and which is rotatably supported by said charging cam axis or charging cam shaft.

10. A shutter device in a camera equipped with a shutter base fixed to a camera body, said shutter base being provided with first and second shutter blades moving between a position to open an aperture for passing through a light beam to expose a film and a position to cover said aperture and a driving mechanism for driving said shutter blades, said driving mechanism comprising:
a first driving lever for driving said first shutter blades,
a second driving lever for driving said second shutter blades,
a first axis for rotatably supporting said first driving lever, and
a second axis for rotatably supporting said second driving lever, wherein at least one of said first and second axes passes through said shutter base and is directly connected to said camera body on a side opposite to said driving lever.

11. A shutter device according to claim 10,
wherein one of said first blade driving lever axis and second blade driving lever axis is screwed to said camera body and wherein any other blade driving lever axes are engaged with said camera body.

* * * * *